United States Patent [19]
Jozlin

[11] 3,897,769
[45] Aug. 5, 1975

[54] SECONDARY COMBUSTION CHAMBERS FOR INTERNAL COMBUSTION ENGINES

[76] Inventor: Joseph A. Jozlin, 2911 Bart Ave., Warren, Mich. 48089

[22] Filed: July 18, 1973

[21] Appl. No.: 380,297

[52] U.S. Cl.......... 123/191 R; 123/37; 123/191 SP; 123/191 B; 123/191 R
[51] Int. Cl............................................. F02b 23/00
[58] Field of Search............ 123/37, 191 SP, 191 B, 123/191 R

[56] References Cited
UNITED STATES PATENTS

| | | | |
|---|---|---|---|
| 10,290 | 2/1883 | Parker | 123/37 |
| 878,925 | 2/1908 | Wolf | 123/37 |
| 1,782,395 | 11/1930 | Bullington | 123/191 SP |
| 2,041,074 | 5/1936 | LaBrie | 123/37 |
| 2,041,940 | 5/1936 | Luker | 123/37 X |
| 2,191,638 | 2/1940 | Adams, Sr. | 123/191 SP |
| 2,738,782 | 3/1956 | Bodine, Jr. | 123/191 B |

*Primary Examiner*—Wendell E. Burns
*Attorney, Agent, or Firm*—William T. Sevald

[57] ABSTRACT

Secondary combustion chambers for internal combustion engines are formed by a cavity lying adjacent to the primary combustion chamber. The secondary chamber communicates via one or more ports with the primary chamber and is thereby supplied with fuel mixture, ignited, and exhausted. One or more jet orifices may also communicate between the primary and secondary chambers so that upon the burning of the fuel in the secondary chamber, jets of flame are shot into the primary chamber to induce burning of residual unburned fuel mixture. A restrictive passage between the port and the cavity induces jet emission from the orifices upon the burning and expansion of the fuel mixture in the secondary chamber. In a piston engine, for example, a portion of the fuel mixture is burned in the primary chamber when the piston is adjacent crank top dead center position of least mechanical advantage and then the portion of the fuel mixture in the secondary chamber is burned while the piston is adjacent to and at crank right angle position of maximum mechanical advantage. The chambers thus provide stratified firing, secondary jet ignition, staged pressure increase compensation for primary chamber increased cubic capacity, and pressure increase coordination with crank action.

3 Claims, 7 Drawing Figures

PATENTED AUG 5 1975  3,897,769

SECONDARY COMBUSTION CHAMBERS FOR INTERNAL COMBUSTION ENGINES

BACKGROUND OF THE INVENTION

The combustion chambers of rotary, piston, and other internal combustion engines have been modified in various ways to try to achieve improved performance of several kinds, but they have not proven entirely satisfactory due to the fact that most are complicated in design and construction, involve special valving and manifolding, added ignition devices, require major modifications of components and chambers, and defeat their purpose by uneconomic cost of design, manufacture, and engine life. Others include changes in piston surface, cylinder wall, and head conformation. Still others ignite the secondary chamber first and then transfer ignition to the primary chamber. Usually each of the developments of the background art are to solve some one problem or other and/or to produce some one improvement or other. While some of these have found acceptance and use for a time, it is notable that the present day engines in commercial use do not incorporate these alleged improvements. Also very few of these so-called improvements relate to the present day problems of improved fuel economy and pollutant reduction. It is not known that any of the background developments ever purported to solve the complex problem of stratified firing, delayed firing of a portion of the fuel mixture, secondary jet ignition, staged pressure increased compensation for primary chamber increased cubic capacity during the power stroke, and pressure increase coordination with crank or driven member mechanical advantage.

SUMMARY OF THE PRESENT INVENTION

The invention provides a secondary combustion chamber adjacent to and in communication with the primary combustion chamber at the piston or rotor of an internal combustion engine. The secondary chamber may be formed by means on the piston or rotor, the head, and/or the block or housing. The secondary chamber may be of any shape and formed by any means. One or more relatively large ports and/or one or more relatively small orifices provide communication between the primary and secondary chambers. A restrictive passage may lie between the port and the secondary chamber for partially blocking exit of burning gasses in the secondary chamber to induce the burning gasses to jet out of the orifices into the primary chamber. The cubic capacity of the secondary chamber may be the same, more, or less than the smallest cubic capacity of the primary chamber at the top of the compression stroke as engineered into the design and desired performance of an engine.

(Re: operation of four-cycle engines)

Upon the exhaust cycle, the primary and secondary chambers are scavenged of prior combustion products. Upon the ensuing suction cycle, the secondary chamber is further scavenged of prior combustion products, and the primary chamber is supplied with new fuel mixture. Upon the ensuing compression cycle, the new fuel mixture and previous combustion residuals are compressed in the primary chamber and the compressed fuel mixture is introduced into the secondary chamber through the port and/or orifices. This supplies the secondary chamber with fuel mixture under pressure equal to or somewhat less than the pressure in the primary chamber.

Upon the ensuing power cycle, the fuel in the primary chamber is ignited by the spark plug and burns with flaming expanding gasses adjacent the crank top dead center position. This increase in pressure bears on the piston and starts to drive the piston and the piston under this drive (and in conjunction with rotational momentum) moves the crank toward its 90° position. During this period the flaming gasses in the primary combustion chamber have ignited the fuel mixture in the port; the flaming fuel mixture in the port has, in turn, ignited the fuel mixture in the secondary chamber; and upon the burning of the fuel mixture in the secondary chamber, the mixture develops flaming expanding gasses and an increase in pressure in the secondary chamber. In the interim, the piston has moved farther down and the primary chamber is now larger in cubic capacity tending to lower the pressure therein, whereupon the pressure in the secondary chamber jets the flaming gasses through the orifices and/or ports into the primary chamber augmenting its pressure adjacent to and at the 90° position of the crank and the enlargement of the primary chamber. The jets of flame from the secondary chamber also augment combustion of the unburned fuel mixture residuals in the primary chamber which are now mixed with combustion products tending to retard their effective burning. This also augments pressure in the primary chamber at and adjacent the 90° crank position converting the gas pressure to mechanical power at and adjacent to the peak mechanical advantage point. Upon further piston travel downwardly the crank approaches and arrives at bottom with the primary chamber at maximum cubic capacity and at this point the secondary chamber emits most of its unburned fuel mixture portions to provide a cooling effect on the components.

(Re: operation of two-cycle engines)

Adjacent the end of the power stroke, the spent fuel mixture is exhausted and new fuel mixture is introduced. The piston then rises in the compression cycle and the new fuel mixture is compressed in the primary and secondary combustion chambers. Adjacent the top position of the piston, the fuel mixture in the primary chamber is ignited and burns and ignites the fuel mixture in the port which, in turn, ignites the fuel mixture in the secondary chamber whereupon the burning expanding gasses emit from the port and/or orifices from the secondary chamber into the primary chamber with the same effect as described relative to four-cycle engine operation.

(Re: operation of rotary engines)

A lobe of the rotor compresses the fuel mixture in the primary chamber and this pressure is fed to the secondary chamber via the communicating port. Upon ignition, the primary chamber first burns and transfers ignition to the secondary chamber whereupon the secondary chamber burns and added pressure is supplied to the propulsion pressure behind the rotor with the same effect as described relative to four-cycle engine operation.

A primary object of the invention is to provide improved combustion of internal combustion engines to conserve fuel and to reduce pollution.

A further object of the invention is to provide simple, inexpensive, and easy to make and to maintain modifications which may be included on engine manufacture and which may be later added on used engines.

A further object of the invention is to reduce fuel consumption, decrease polluting emissions, maintain substantial power, and to keep the engine cool to avoid burning exhaust valves and scoring pistons.

These and other objects of the invention will become apparent by reference to the detailed description of the illustrated embodiments of the invention taken in connection with the accompanying drawing.

DETAILED DESCRIPTION OF THE ILLUSTRATED EMBODIMENTS

Figure 1:
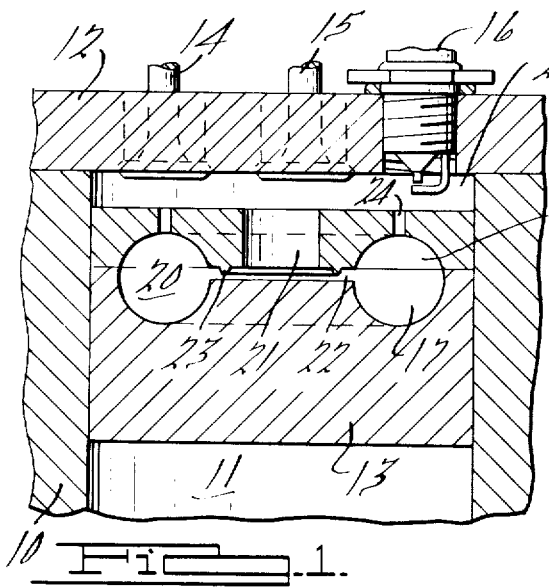
FIG. 1 is a vertical cross-sectional view of a portion of the cylinder, piston, and head of a valve-in-head engine with parts broken away showing the primary chamber and the secondary chamber, port, and orifices carried by the piston.
Figure 2:
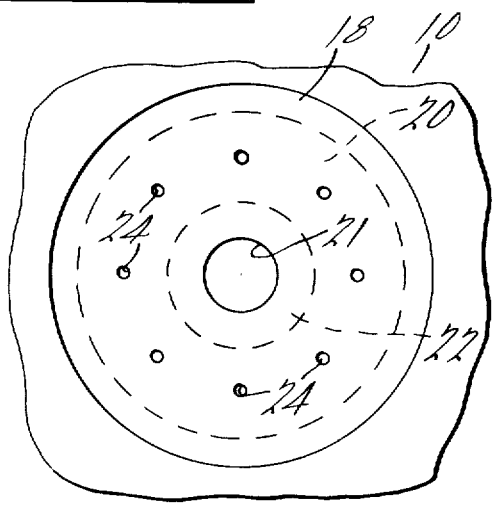
FIG. 2 is a top plan view of block portion of the engine block seen in FIG. 1, with the head removed and showing the top of the piston with the engine block broken away, indicating the secondary chamber in broken lines, and showing a central port and radially located jet orifices.

Referring now to the drawing wherein like reference numerals refer to like and corresponding parts throughout the several views, the engine components diagrammatically illustrated therein comprise, FIGS. 1 and 2, a block 10, a cylinder 11, a head 12, and a piston 13. An intake valve 14, an exhaust valve 15, and a spark plug 16 lead through the head 12 into the cylinder 11 above the piston 13. The top of the piston 13 has an annular groove 17. A cap 18 on the top of the piston 13 has an annular groove 19 mating with the annular groove 17. Together the annular grooves 17 and 19 form the secondary chamber 20 which is doughnut shaped in this embodiment. A relatively large port 21 leads through the cap 18 to a circular radial passage 22 or to a series of radial passages 22. A restriction rib 23 lies in the passage 22. Relatively small orifices 24 lead through the top of the cap 18 and provide communication between the primary and secondary chambers. The space in the cylinder 11 between the head 12 and the top of the cap 18 constitutes the primary chamber 25.

Figure 3:
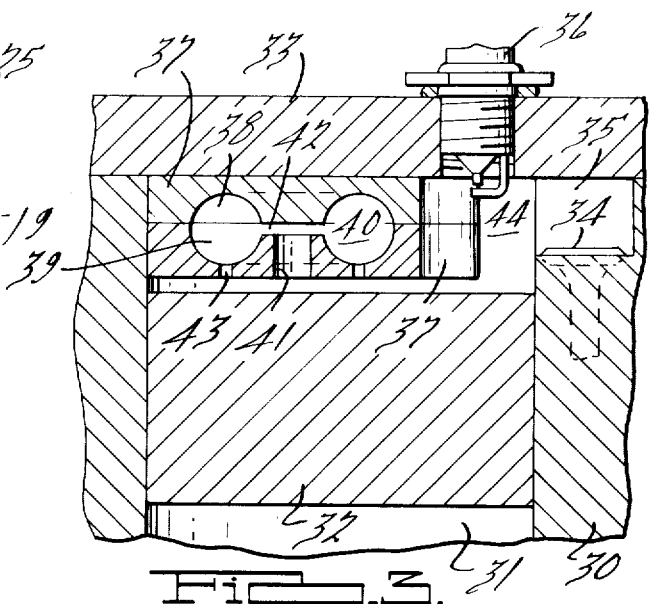
FIG. 3 is a vertical cross-sectional view of a portion of the cylinder, piston, and head of a valve-in-block engine with parts broken away showing the primary chamber and the secondary chamber, port, and orifices.
Figure 4:
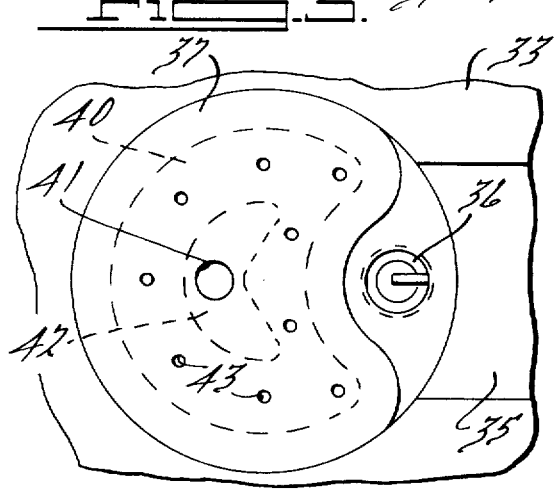
FIG. 4 is a bottom plan view of the engine head seen in FIG. 3, with the block removed and with the head broken away indicating the secondary chamber in broken lines and showing the port and orifices in solid lines.

The diagrammatically illustrated embodiment of FIGS. 3 and 4 comprises a block 30, a cylinder 31, a piston 32, and a head 33. Intake and exhaust valves 34 lie in a recess 35 and lead to the cylinder 31 above the piston 32 and to a spark plug 36 in the head 33. A split case 37 has internal grooves 38 and 39 forming a cavity constituting the secondary chamber 40. A relatively large port 41 and at least one radial passage 42 provide communication between the primary chamber and the secondary chamber 40. Relatively small orifices 43 communicate between the secondary chamber 40 and the primary chamber. The space between the top of the piston 32 and the head 33 and case 37 together with the recess 35, constitutes the primary chamber 44. The case 37 is shaped to conform to the annular wall of the cylinder 31 except at the spark plug 36 and the valves 34 where the case 37 is indented to provide communication to the primary chamber 44 past the case 37 for the valves 34 and the spark plug 36.

Figure 5:
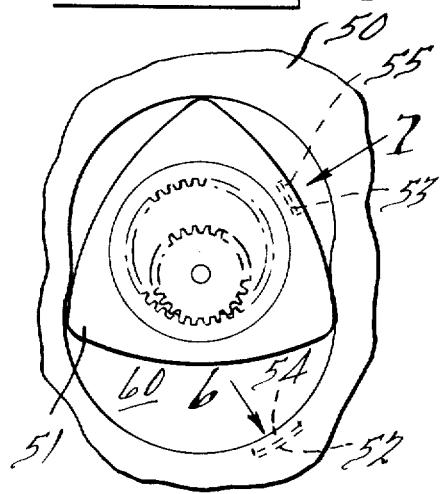
FIG. 5 is a vertical cross-sectional view of a rotary engine diagrammatically indicating secondary combustion chambers in dotted lines in both the rotor and in the housing.
Figure 6:
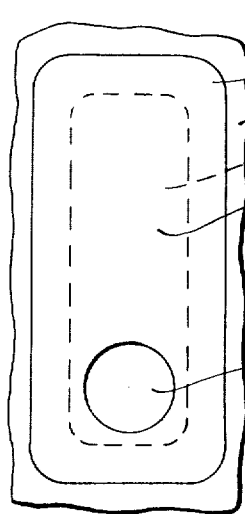
FIG. 6 is an enlarged face elevational view of the secondary combustion chamber such as indicated on the rotor of FIG. 5, with parts broken away, showing the secondary chamber in dotted lines and a port in solid lines.
Figure 7:
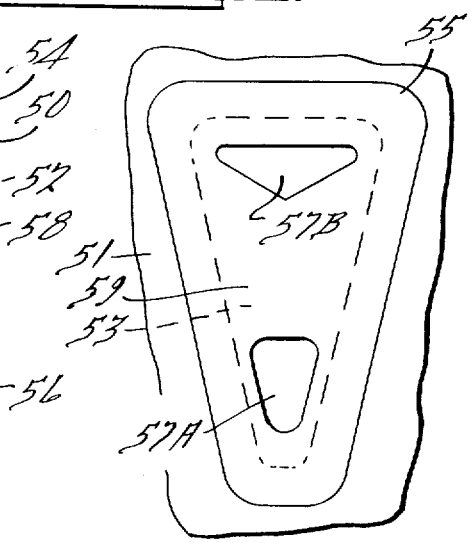
FIG. 7 is an enlarged face elevational view of the secondary chamber such as indicated on the housing of FIG. 5, with parts broken away, showing the secondary chamber in dotted lines and two ports in solid lines.

The diagrammatically illustrated embodiments of FIGS. 5, 6, and 7 comprise a block 50, a rotor 51, a cavity 52 in the block 50 facing the rotor 51, and/or a cavity 53 in the rotor 51 facing the block 50. The cavities 52 and 53 lie cross-ways so as to cooperate with the lobes and seals of the rotor 51. A plate 54 overlies the cavity 52 and has a port 56, FIG. 6. The cavity 52 under the plate 54 constitutes the secondary chamber 58 and the space between the rotor 51 and the interior of the block 50 constitutes the primary chamber 60. A plate 55 overlies the cavity 53 and has ports 57A and 57B, FIG. 7. The cavity 53 under the plate 55 constitutes the secondary chamber 59 and the space between the block 50 and the rotor 51 constitutes the primary chamber 60. The location of the primary chamber 60 and the secondary chambers 58 and 59 relative to the block 50 and the rotor 51 are for illustrative purposes and it is understood that in the art of this type engine, that they will be located adjacent points of peak compression in the power cycle behind the rotor 51 lobe being driven.

The operation of the devices has been described in the summary. The means forming the cavities constituting the secondary combustion chambers may be of any type, kind, or construction and may be formed integrally, separately, and/or jointly with other engine elements. The configuration of the cavities constituting the secondary combustion chambers may be shaped as desired. The cubic capacity of the secondary chamber relative to the cubic capacity of the primary chamber may be varied as desired and the ports, orifices, and restrictions designed and sized to suit the engineering of the engine, its desired performance characteristics, power development, and calculated speed conditions.

A working embodiment of an engine equipped with the invention indicates about the same development of mechanical power under the same work load conditions at about half the fuel consumption for the same time period compared to the same engine under the same conditions without the invention. It also appears from actual running of an engine equipped with the invention that it maintains about equal operating temperature as the same engine under the same conditions when not so equipped.

The appended claims define the scope of the invention.

I claim:

1. A secondary combustion chamber for providing burning stage of the fuel mixture in an internal combustion engine by delaying the burning of a portion of the fuel mixture;

the engine having means defining a primary combustion chamber, a moving member in the primary chamber, fuel mixture intake leading to the primary chamber, combustion products exhaust leading from the primary chamber, and an igniting element communicating with the primary chamber;

said secondary combustion chamber comprising, means forming a closed self-sealed cavity constituting a secondary combustion chamber adjacent said primary chamber, and means forming at least one port communicating between said primary chamber and said closed self-sealed cavity of said secondary chamber;

upon the compression cycle of the moving member, the fuel mixture being compressed in the primary chamber and introduced into said closed self-sealed cavity of said secondary chamber under pressure via said port;

upon the power cycle of the moving member, the igniting element fires the fuel mixture in the primary chamber which burns with resulting first stage expanding flaming gasses and resultant pressure driving against the moving member and the first stage flaming fuel communicates ignition to the fuel mixture in said port which burns and communicates ignition to the fuel mixture in said closed self-sealed cavity of said secondary chamber effecting second stage expanding flaming gasses emitting from said port with second stage resultant added pressure driving against the moving member.

2. In a secondary combustion chamber as set forth in claim 1, said port being relatively large, and said means forming at least one relatively small jet orifice communicating between said closed self-sealed cavity defining said secondary chamber and the primary chamber for emitting expanding flaming gasses from said secondary chamber through both said jet orifice and said port into the primary chamber.

3. In a secondary combustion chamber as set forth in claim 2, said means including a restrictive passage leading between said port and said secondary chamber to back-block burning expanding gasses in said secondary chamber relative to said port to induce burning expanding gasses to emit from said secondary chamber through said orifice into said primary chamber.

* * * * *